(12) United States Patent
Biver et al.

(10) Patent No.: US 10,379,241 B2
(45) Date of Patent: Aug. 13, 2019

(54) TRUNCATION DIAGRAM DETERMINATION FOR A PLURI-GAUSSIAN ESTIMATION

(71) Applicant: TOTAL SA, Courbevoie (FR)

(72) Inventors: Pierre Biver, Pau (FR); Vincent Henrion, Pau (FR); Dimitri D'Or, Sombreffe (FR); Denis Allard, Avignon (FR)

(73) Assignee: TOTAL SA, Courbevoie (FR)

( * ) Notice: Subject to any disclaimer, the term of this patent is extended or adjusted under 35 U.S.C. 154(b) by 459 days.

(21) Appl. No.: 14/411,430

(22) PCT Filed: Apr. 12, 2013

(86) PCT No.: PCT/EP2013/057743
§ 371 (c)(1),
(2) Date: Dec. 26, 2014

(87) PCT Pub. No.: WO2014/000902
PCT Pub. Date: Jan. 3, 2014

(65) Prior Publication Data
US 2015/0160359 A1 Jun. 11, 2015

(30) Foreign Application Priority Data
Jun. 26, 2012 (EP) .................................. 12305751

(51) Int. Cl.
*G01V 1/30* (2006.01)
(52) U.S. Cl.
CPC ............... *G01V 1/30* (2013.01); *G01V 1/306* (2013.01); *G01V 2210/665* (2013.01)
(58) Field of Classification Search
CPC .... G01V 1/306; G01V 1/30; G01V 2210/665; G01V 11/00; G01V 1/32; G01V 2210/43; G01V 2210/44; G01V 99/005; G01V 1/50
See application file for complete search history.

(56) References Cited

U.S. PATENT DOCUMENTS 7,392,166 B2 * 6/2008 Le Ravalec-Dupin ..................... G01V 11/00 703/10
2004/0167757 A1 * 8/2004 Struijs ................. G06F 17/5018 703/2

(Continued)

OTHER PUBLICATIONS

Serrano et al., "Application of the Truncated Plurigaussian Method to Delineate Hydrofacies Distribution in Heterogeneous Aquifers", Jul. 17-22, 2012, XIX International Conference on Water Resources, pp. 1-8.*

(Continued)

*Primary Examiner* — Mischita L Henson
(74) *Attorney, Agent, or Firm* — Patterson Thuente Pedersen, P.A.

(57) ABSTRACT

The present invention relates to a method for determining a truncation diagram for a pluri-Gaussin geological parameter estimation associated with a zone of a real subsoil. The method comprises receiving an auxiliary variable describing the zone, computing a normalized variable based on the auxiliary variable and determining a weighted probability map for the normalized variable, each point of the weighted probability map being in correspondence with a point, of the truncation diagram. Moreover for each point of the truncation diagram, the method further comprises determining an associated geological parameter based on the probability value of each point of the weighted probability map. The method is also used to adapt truncation diagram to global or local target, proportions of the facies model to built.

11 Claims, 8 Drawing Sheets

(56) References Cited

U.S. PATENT DOCUMENTS

| | | | | |
|---|---|---|---|---|
| 2006/0180306 | A1* | 8/2006 | Stone | E21B 43/166 166/252.6 |
| 2008/0162093 | A1* | 7/2008 | Nivlet | G01V 1/30 703/2 |
| 2011/0231170 | A1* | 9/2011 | Biver | G01V 11/00 703/2 |
| 2014/0149044 | A1* | 5/2014 | Allard | G01V 11/00 702/13 |

OTHER PUBLICATIONS

Emery, "Simulation of geological domains using the plurigaussian model: New developments and computer programs", no date, pp. 1-13.*

Unknown, "Pluri-Gaussian Simulation", Apr. 27, 2017, accessed online May 18, 2018 https://www.petromehras.com/petroleum-software-directory/.*

Allard D et al: "Non-parametric diagrams for plurigaussian simulations of lithologies", Ninth International Geostatistics Congress, Jun. 11, 2012 (Jun. 11, 2012), pp. 1-13, XP007922335, Retrieved from the Internet: URL:geostats2012.nr.no/pdfs/1746887.pd [retrieved on Oct. 21, 2013] the whole document.

Emery X et al: "Geostatistical modelling of rock type domains with spatially varying proportions: application to a porphyry copper deposit", Journal of the Southern African Institute of Mining and Metallurgy, Southern African Institute of Mining and Metallurgy—Saimm, Johannesburg, South Africa, vol. 108, No. 5 May 1, 2008 (May 1, 2008), pp. 285-292, XP007922354, ISSN: 2225-6253 Retrieved from the Internet: URL:http://www.saimm.co.za/Journal/v108n05p285.pdf [retrieved on Oct. 21, 2013] p. 1 p. 3, col. 2—p. 4, col. 2.

Robin Dunn: "Plurigaussian Simulation of rocktypes using data from a gold mine in Western Australia", Thesis, Edith Cowan University, Australia, May 1, 2011 (May 1, 2011), pp. 1-100, XP007922353, abstract pp. 30-35 pp. 45-64.

Beucher Helene et al: "Complex Features in Sedimentology and Truncated Pluri-Gaussian Simulations", AAPG Annual Convention; May 11-14, 2003; Salt Lake City, Utah, USA, American Association of Petroleum Geologists With SEPM (Society for Sedimentary Geology, USA, Jan. 1, 2003 (Jan. 1, 2003), p. 584, XP007922355, the whole document.

\* cited by examiner

TRUNCATION DIAGRAM DETERMINATION FOR A PLURI-GAUSSIAN ESTIMATION

RELATED APPLICATIONS

The present application is a National Phase entry of PCT Application No. PCT/EP2013/057743, filed Apr. 12, 2013, which claims priority from EP Patent Application No. 12305751.5, filed Jun. 26, 2012, said applications being hereby incorporated by reference herein in their entirety.

BACKGROUND OF THE INVENTION

The present invention relates to geological parameters determination and especially to Gaussian and pluri-Gaussian simulations of lithologies.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

The estimation of an oil reservoir or a mining deposit usually comprises determination of geological parameters such as the facies composition of a subsoil.

Truncated Gaussian simulations have been first introduced in 1987 and have been commonly used in geological simulation to determine realistic facies repartition. These simulations are based on a random field truncation, therefore a truncation order that should be defined for each simulation.

With truncated Gaussian simulations, lithofacies are sorted for truncation (i.e. stratigraphic sequence): lithofacies that are not successors in the stratigraphic sequence will never be in contact. This feature has been proved to be too restrictive: for example, the facies may be impossible to order as there is no such order in the subsoil; moreover specific facies may be in contact with more than two facies.

To overcome these limitations, pluri-Gaussian simulations were proposed in 1994 and 1996. The basic idea behind pluri-Gaussian simulations is to start out by simulating more than one Gaussian random fields at every grid point in the study domain and to use some simple rule to convert these Gaussian values into lithotype indicators (or more generally into geological categorical property or facies).

In pluri-Gaussian models, a set of p Gaussian random fields are used to define the lithofacies structure. Most of the time p is set to 2 but similar works may be made with different values of p. The multi-variate Gaussian field is transformed into a multi-variate uniform field. Lithofacies are then assigned according to a truncation diagram (named also rock type rule or facies assignation diagram). Typical truncation diagrams separate the bi-variate uniform domain along vertical and horizontal lines. The precise layout or these lines defines the type of the chosen model.

These simulations are intended to model complex geology with different structure orientations and heterogeneous deposits (channels, reefs, bars, differently oriented facies, sets of conjugate veins or ore types where geological constraints apply, etc.). They may provide realistic and detailed images of internal structure.

These simulations may allow controlling the facies relationships and boundaries when dealing with complex geometrical configurations.

Nevertheless, such Gaussian or pluri-Gaussian simulations have drawbacks.

For example, it may be difficult to determine the relationship between Gaussian variables and physical processes. Moreover, the determination of the truncation diagram may not be easy and intuitive.

If non-stationary parameters are present in the model, the update of the truncation diagram, according to the non-stationary parameters, may be very complex. Therefore, person skilled in the art would prefer creating simplistic truncation diagrams (for instance, with rectangle domains) in order to be able to adapt them to target proportions.

There is thus a need for a method to determine complex (but adequate) truncation diagram in order to efficiently model and estimate facies repartition in a subsoil.

SUMMARY OF THE INVENTION

The invention relates to a method for determining a truncation diagram for a pluri-Gaussian estimation of geological parameters associated with a zone of a real subsoil, the truncation diagram having a plurality of points. The method comprises:

for each geological parameter in a plurality of geological parameters:
  receiving an auxiliary variable describing the zone;
  computing a normalized variable based on the auxiliary variable;
  determining a weighted probability map for the normalized variable, the probability map having a plurality of points, each point of the weighted probability map being in correspondence with a point of the truncation diagram, each point of the weighted probability map having a probability value;

for each point of the truncation diagram:
  determining an associated geological parameter based on the probability value of each point of the weighted probability map, each point of the weighted probability map being in correspondence with said point of the truncation diagram.

An accurate determination of a truncation diagram is important in order to model subsoil in an adequate manner. If geologists or well engineers try to determine a truncation diagram, in most case, they simplify the diagram (to be able to handle its complexity) and achieve a non-accurate determination.

In addition, this method enables the determination of a plurality of zones in a same area in order to adapt the truncation diagram based on the target proportions at the exact location in a zone in the plurality of zones: therefore, it is possible to determine a truncation diagram function which returns a truncation diagram based on coordinates in a zone and/or the target proportions at said coordinates.

Therefore, for industrial benefits, there is a true need to determine efficiently truncation diagram.

Auxiliary variables may be for instance, seismic attributes such as amplitude attributes (mean amplitude, average Energy, root mean square amplitude, maximum magnitude, AVO attributes, anelastic attenuation factor), time/horizon attributes (coherence, dip, azimuth, curvature), or log measurement attributes at wells (bulk density log, neutron log, photo-electric factor log, . . . ).

Auxiliary variables may also be control points defined by the user.

The auxiliary variable may be an n-variate variable, n>1.

The method may be used to adapt truncation diagram to global or local target proportions of the facies model to built.

In a possible embodiment, for each geological parameter in a plurality of geological parameters, the auxiliary variable may comprise two one dimensional components.

Hence, the auxiliary variable U may have two components V and W (i.e. U=(V,W)) with V and W being real values.

The variable U may be represented in a two-dimensional domain. This variable U may returns real values (e.g. U(10, 0.5)=5.7).

In addition, the normalized variable may be computed according a uniform transform.

The transformation may also be a linear transform, a Gaussian transform or any other transforms, which returns a [0,1]×[0,1] domain.

Determining a probability map may comprise computing kernel regression estimate of the normalized variable.

From the simultaneous knowledge of the auxiliary variable and the lithofacies at data points $(x_1, \ldots x_n)$ (e.g. measured at wells), a kernel regression estimate of these conditional probabilities may be $$\hat{f}_k(\vec{u}) = P(k \mid \vec{u}) = \frac{\sum_{i=1}^{n} K_h(\vec{u} - \vec{u}_i)\Big|_{[F(\vec{u}_i)=k]}}{\sum_{i=1}^{n} K_h(\vec{u} - \vec{u}_i)},$$

where i−1 . . . n is an index on all data and $I_{[A]}$ is the indicator function of event A, equal to 1 if A is verified and equal to 0 otherwise. The function $K_h(x)$ may be the kernel function $$K_h(\vec{x}) = \frac{K\left(\frac{\vec{x}}{h}\right)}{h}$$

where K(x) is an even function such that $$\int_{R^2} K(\vec{x}) d\vec{x} = 1$$

and $$\int_{R^2} K^2(\vec{x}) d\vec{x} < +\infty.$$

Common kernels are the Gaussian kernel $$K(\vec{x}) = (2\pi)^{-1} e^{\frac{-\|\vec{x}\|^2}{2}}$$

or $$K(\vec{x}) = \frac{3 \cdot \left(1 - \|\vec{x}\|^2\right)^2}{\pi}\Bigg|_{[\|\vec{x}\|<1]}$$

or the BiSquare kernel, or the Epanechnikov kernel.

According to another embodiment, determining a weighted probability map may comprise weighting each probability value of a probability map with a determined coefficient. Such weighting may ensure that all probability values of the probability map is in the domain [0,1]. The weighting may be equal to 1 if the probability values are already in the domain [0,1].

The weight used for determining a weighted probability map may be function of coordinates of the zone.

Therefore, it may be possible to adapt the truncation diagram according to local characteristics of the zone.

Furthermore, for each point of the truncation diagram, determining an associated geological parameter may comprise:
identifying a probability map in the plurality of weighted probability map for which the probability value of the point in correspondence with said point of the truncation diagram is maximum;
associating the geological parameter of the identified probability map with said point of the truncation diagram.

The truncation diagram may also be referred to as "assignation diagram" or a "rock-type rule".

In order to verify specified proportion of geological parameter (e.g. lithofacies) it is possible to adapt the weights of each probability maps, for instance, by iterations or by a Marquardt regularization.

Geological parameters may be facies or lithotypes.

Another aspect of the invention relates to a method to determine estimated geological parameters in a model of a real subsoil. The method may comprise, for at least one zone of the model:
determining a weight value for each geological parameter in the plurality of geological parameters;
determining truncation diagram according to the determined weight values and according to the method described above;
computing estimated geological parameters of the at least one zone using a pluri-Gaussian truncated estimation.

The determination of the weight value may be done using for instance a iterative process like Markard algorithm.

Yet another aspect of the invention relates to a device for determining a truncation diagram for a pluri-Gaussian geological parameter estimation associated with a zone of a real subsoil, the truncation diagram having a plurality of points. The device comprises:
an input interface for receiving an auxiliary variable for each geological parameter in a plurality of geological parameters describing the zone;
a circuit to compute a normalized variable based on the auxiliary variables;
a circuit to determine a weighted probability map for each normalized variable, the probability map having a plurality of points, each point of the weighted probability map being in correspondence with a point of the truncation diagram, each point of the weighted probability map having a probability value;
a circuit to determine, for each point of the truncation diagram, an associated geological parameter based on the probability value of each point of the weighted probability map, each point of the weighted probability map being in correspondence with said point of the truncation diagram.

A fourth aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the Figures of the accompanying drawings, in which like reference numerals refer to similar elements and in which.

DESCRIPTION OF PREFERRED EMBODIMENTS

Figure 1A:
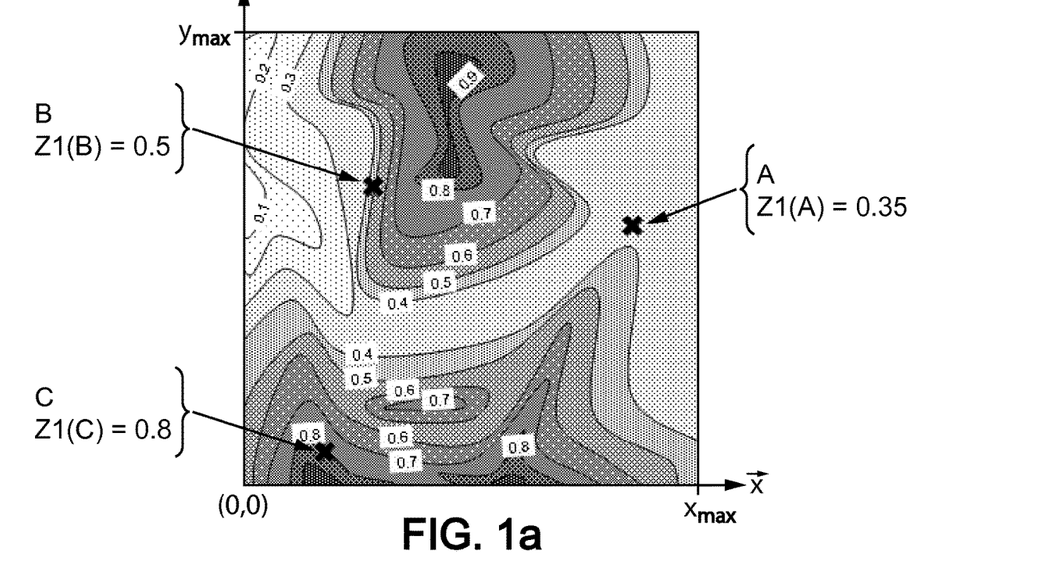
FIG. 1a is a representation of a first two-dimensional random variable.

FIG. 1a is a representation of a first two-dimensional random variable Z1. In a two-dimensional domain $U=\{[0, x_{max}], [0, y_{max}]\}$, it is possible to compute a random variable Z1 having a coordinate (x,y) with x in $[0, x_{max}]$ and y in $[0, y_{max}]$.

This random variable Z1 may be a continuous variable.

Then, for each coordinate (x,y) in the domain U, the random variable Z1 has a stochastic value. For instance:
the stochastic value of point A is Z1(A)=0.35;
the stochastic value of point B is Z1(B)=0.5; and
the stochastic value of point C is Z1(C)=0.8.

Figure 1B:
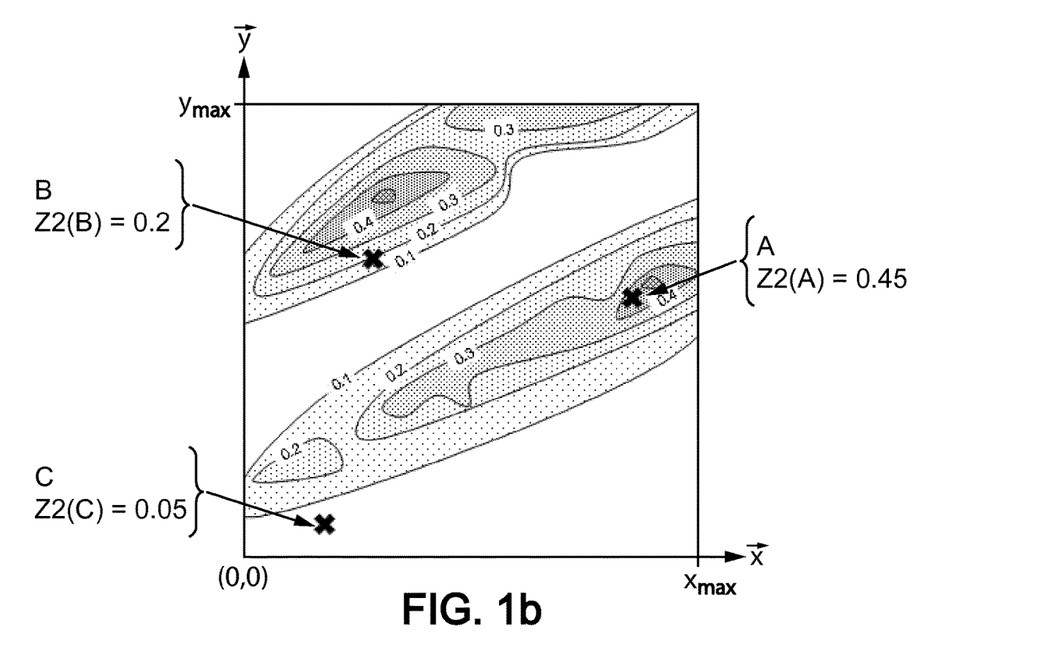
FIG. 1b is a representation of a second two-dimensional random variable.

FIG. 1b is a representation of a second two-dimensional random variable Z2. In this example, random variable Z2 is defined in the same domain U.

The value of the variable Z2 is different from the value of Z1 for points having same coordinates:
the stochastic value of point A is Z2(A)=0.45;
the stochastic value of point B is Z2(B)=0.2;
the stochastic value of point C is Z2(C)=0.05.

Figure 1C:
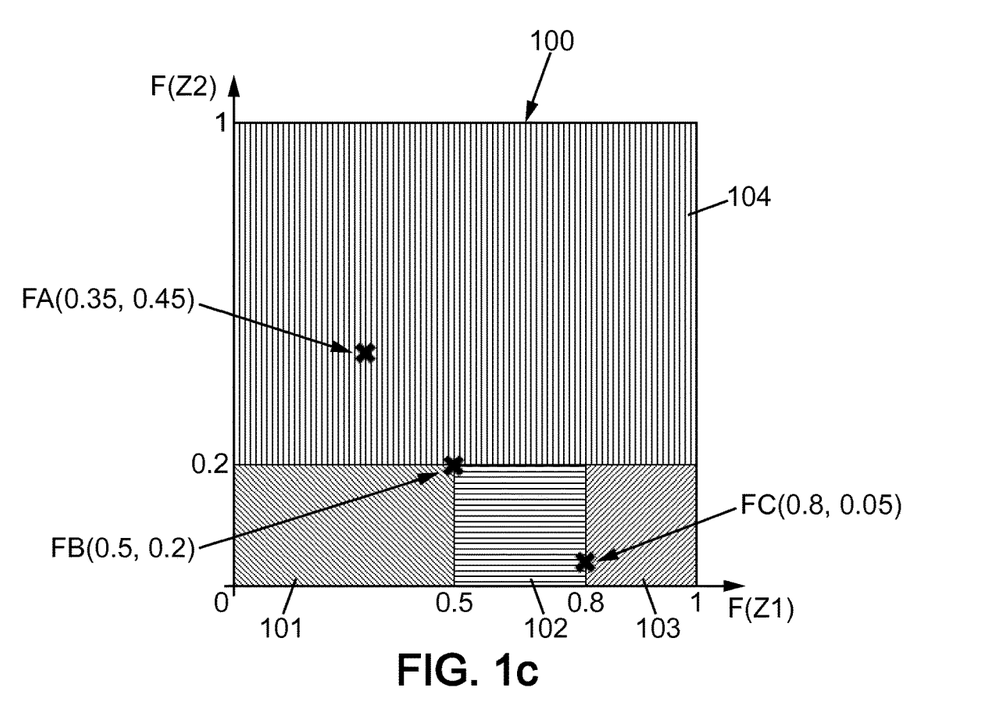
FIG. 1c is an example of a truncation diagram.

FIG. 1c is an example of a simple truncation diagram with rectangular domains. This diagram 100 may be used to determine a lithology map.

Four different facies are represented in this truncation diagram: facies 101, 102, 103 and 104 respectively represented by a rectangle or a rectangular domain.

Figure 1D:
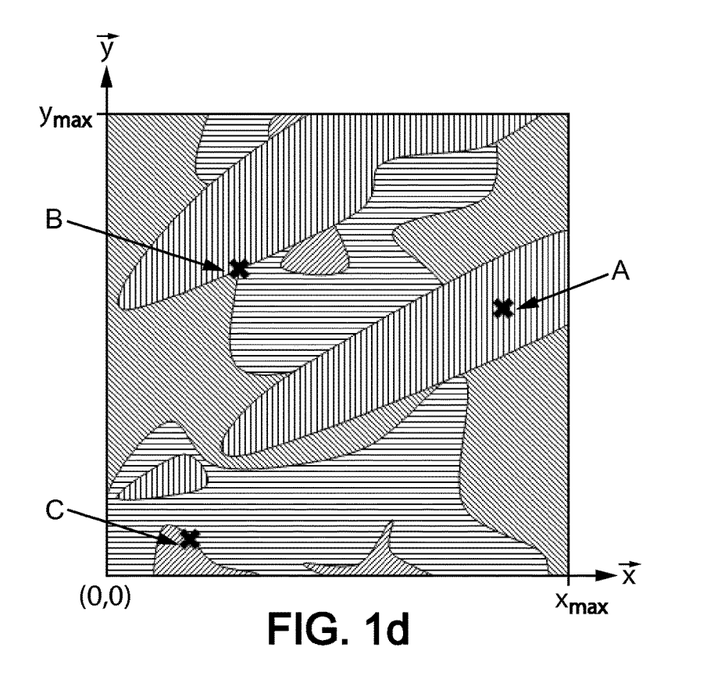
FIG. 1d is a representation of a lithology map.

In order to determine a lithology map (as shown in FIG. 1d), each point of the domain $U=\{[0, x_{max}], [0, y_{max}]\}$, will be evaluated according to this truncation diagram.

For instance, to determine facies associated with point A of FIG. 1d, the following algorithm may be followed:
determining the value Z1(A) of point A in FIG. 1a, i.e. 0.35;
determining the value Z2(A) of point A in FIG. 1b, i.e. 0.45;
identifying a point FA in the truncation diagram having coordinates (Z1(A), Z2(A)) i.e. FA(0.35, 0.45);
identifying the zone of the truncation diagram comprising point FA, i.e. rectangle associated with facies 104;
associating the facies of the identified zone with point A in FIG. 1d, i.e. facies 104.

Same algorithm may be used for other points of domain U.

For instance, for point B, the identified point in the truncation diagram is the point FB which is on an intersection point separating facies 101, 102 and 104. Therefore, point B is also on intersection point separating facies 101, 102 and 104 in FIG. 1d.

For point C, the identified point in the truncation diagram is the point FC which is on a separation line between facies 102 and 103. Therefore point C is also on a separation line of facies 102 and 103 in FIG. 1d.

This method described above may be referred to "Gaussian estimation for facies determination".

Figure 2A:
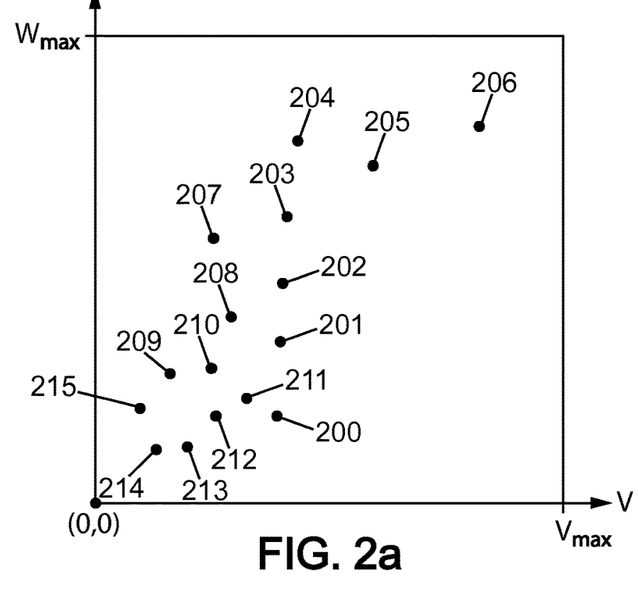
FIG. 2a is a possible two-dimensional representation based on auxiliary variables for a geological parameter.

FIG. 2a is a possible two-dimensional representation based on two auxiliary variables for a geological parameter.

Auxiliary variables may be for instance seismic attributes $I_p$ and $P_r$ (when available), or synthetic variables.

For instance, a global variable may be defined a set of vector $G=(\vec{x}_1, \ldots \vec{x}_n)$. Facies information at a given point (for instance, thanks to wells and/or drill-holes) may allow creating a plurality of separated variables $\{G_k\}$ comprising values for each facies from the global variable G. For each k, $G_k$ may comprise a subset of vectors in $(\vec{x}_1 \ldots \vec{x}_n)$, the subset of vector being representative of a given facies.

The first component of vectors is, for instance, seismic attribute $I_p$ and the second component is seismic attribute $P_r$.

Each point of the variable represented in FIG. 2a (200, 201, 202 ... 215) represents a value of the variable (or a vector). The repartition of points in the domain $\{[0, V_{max}], [0, W_{max}]\}$ is not uniform.

In order to quantify the density of the points, a kernel density estimate or kernel regression estimate may be computed. For instance, FIG. 2b is a representation of a kernel density estimation for a one-dimensional variable.

Figure 2B:
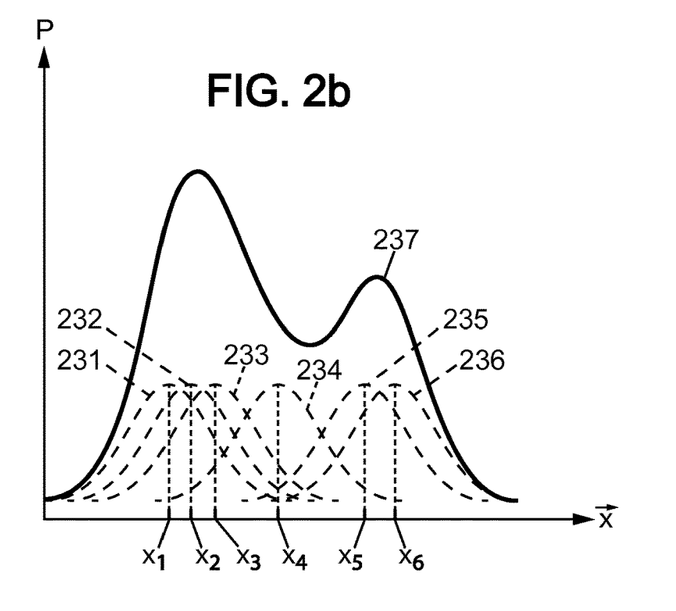
FIG. 2b is a representation of a kernel density estimation for a one-dimensional variable.

In FIG. 2b, six points representative of a one-dimensional variable are disposed along the axis $\vec{x}$: $x_1, x_2, x_3, x_4, x_5$, and $x_6$. To determine a local density estimate, a kernel density estimator $\hat{f}_h(x)$ is centered on the abscissa of each point, wherein, for instance, $$\hat{f}_h(x) = \frac{1}{nh}\sum_{i=1}^{n} K\left(\frac{x-x_i}{h}\right),$$

h>0 and K(.) is the kernel (symmetric function such as uniform one, triangular one, bi-weight one, tri-weight one, Epanechnikov one, normal one, etc.).

For point $x_1$ (respectively $x_2, x_3, x_4, x_5$, and $x_6$), a local density estimate 231 (respectively 232, 233, 234, 234, 235, 236) is placed so that the maximum of this local estimate corresponds to the abscissa of point $x_1$ (respectively $x_2, x_3, x_4, x_5$, and $x_6$).

When all points ($x_1, x_2, x_3, x_4, x_5$, and $x_6$), are associated with a local density estimate (231, 232, 233, 234, 234, 235, 236), the local estimates are summed to compute a global kernel density estimate 237.

Although FIG. 2b is a representation of a density estimate for a one-dimensional variable, the generalization to a pluri-dimensional variable is possible thanks to the above disclosure.

Figure 3A:
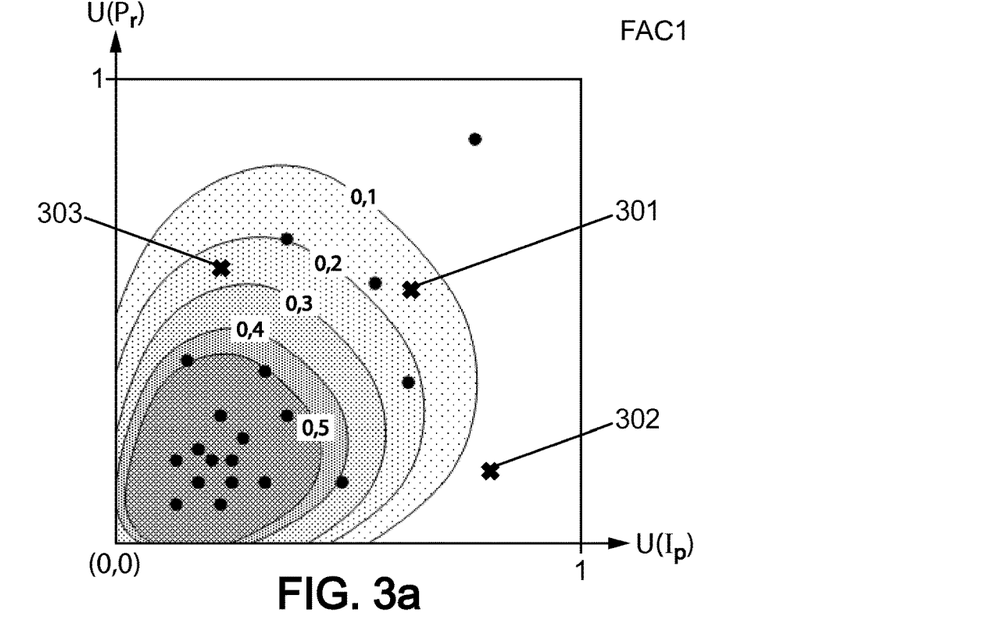
FIGS. 3a to 3c are examples of probability maps for three different facies.
Figure 3B:
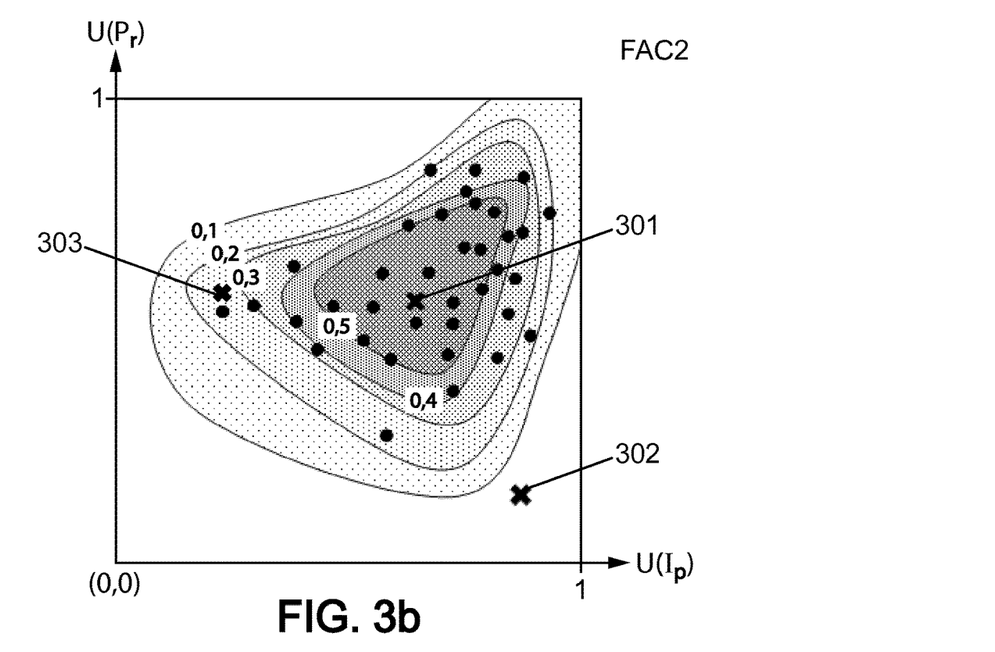
Figure 3C:
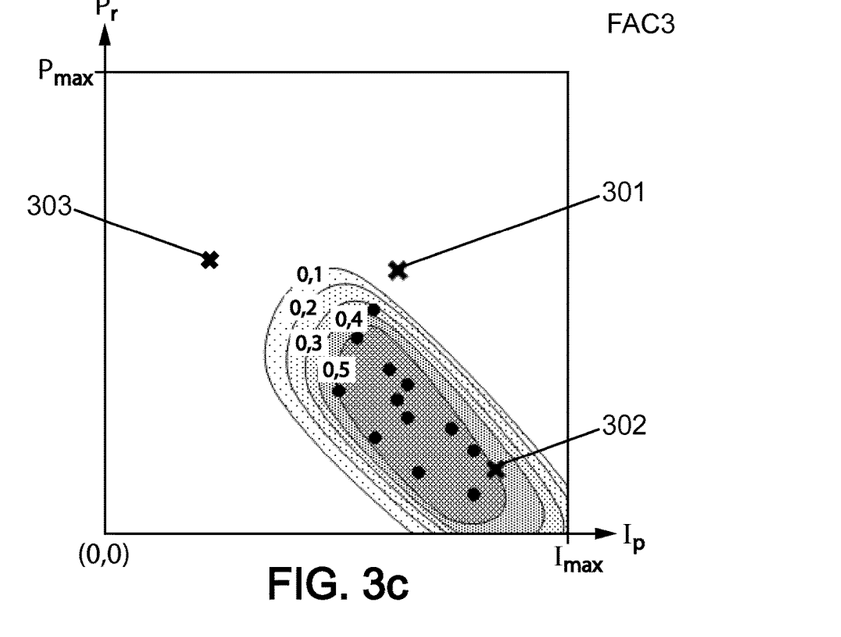

FIGS. 3a (respectively 3b and 3c) is schematic representation of a density estimate (or probability maps) in a bi-variate domain $[U(I_p), U(P_r)]$ representing a first facies (respectively a second and a third facies).

This bi-variable $U(I_p, P_r)$ is an auxiliary variable (seismic parameters) describing a zone of a real subsoil.

For instance, the density estimate (i.e. "probability value") of the first facies FAC1 (see FIG. 3a) in point 301 is 0.15, in point 302 is 0, and in point 303 is 0.25.

The density estimate of the second facies FAC2 (see FIG. 3b) in point 301 is 0.5, in point 302 is 0.05, and in point 303 is 0.25.

Finally, the density estimate of the third facies FAC3 (see FIG. 3c) in point 301 is 0, in point 302 is 0.5, and in point 303 is 0.

In addition, it is possible to transform the variable so that the values (i.e $U(i,p)$ with p in $[0, I_{max}]$ and I in $[0, P_{max}]$) of the represented variables are in the domain $[0,1]$. Gaussian transformation are suggested to transform the values in $[0,1]$ domain but other transformations may also be used such as piecewise linear transformations, logarithmic transformations, etc.

The above transformations (or only a selection of them) may be considered as, for an auxiliary variable, a computing of a normalized variable.

Figure 4:
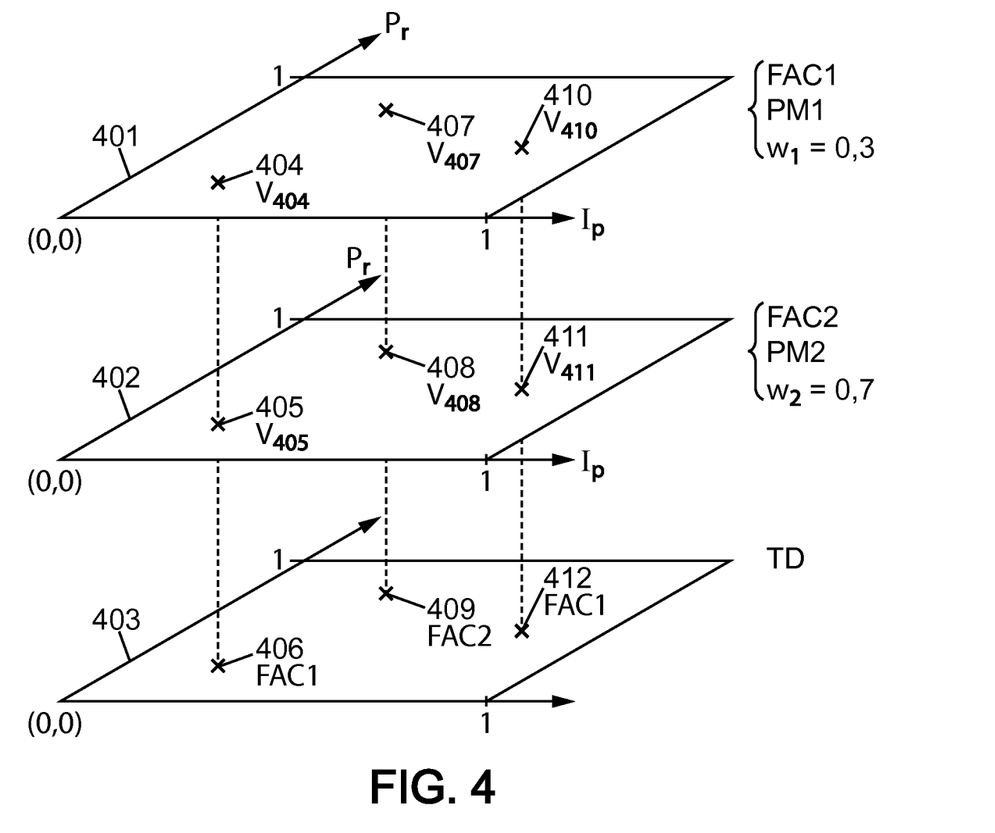
FIG. 4 is a representation of the computing of a truncation diagram based on two probability maps and depending on weights.

FIG. 4 is a representation of the computing of a truncation diagram (element 403) based on two probability maps 401 and 402 (or "density map") such as the probability maps of FIG. 3a, 3b or 3c.

The truncation diagram 403 is defined in a domain $\{[0,1], [0,1]\}$ like the probability maps 401 and 402.

Probability map 401 represents facies FAC1 and probability map 402 represents facies FAC2.

As points 404 and 406 (respectively 405 and 406, 407 and 409, 408 and 409, 410 and 412, 411 and 412) have same coordinates in domain $\{[0,1], [0,1]\}$, it is possible to consider that point 404 (respectively 405, 407, 408, 410, 411) of a probability map 401 (respectively 402, 401, 402, 401, 402) is in correspondence with point 406 (respectively 406, 409, 409, 412, 412) of the truncation diagram 403.

Even if definition domains of truncation diagram or probability maps are different from $\{[0,1], [0,1]\}$, it is always possible to create a correspondence mapping between points of a probability map and between points of the truncation diagram according to specific correspondence rules.

As described above, points of a probability maps have different probability values. For instance, point 404 (respectively 405, 407, 408, 410 and 411) is associated with the probability value $V_{404}$ (respectively $V_{405}$, $V_{407}$, $V_{408}$, $V_{410}$ and $V_{411}$).

Probability values of points of probability maps may be weighted in order to modulate the importance of these probability maps. For instance, probability values of points of probability maps 401 (respectively 402) are weighted according to a weight $w_1=0.3$ (respectively $w_2=0.7$).

Advantageously, the sum of weights of probability maps (i.e. $w_1+w_2$) may be equal to 1. In another embodiment, all weights for all probability maps may be equals to 1. Once probability values of probability maps are weighted, the probability maps may be referenced as "the weighted probability maps".

To identify the associated facies with point 406 (respectively 409, 412) of the truncation diagram, weighted probability values (i.e. $w_1 V_{404}$ and $W_2 V_{405}$) of correspondent points (i.e. 404 and 405) in the probability maps 401 and 402 are compared. If the value of $(V_{404} \cdot w_1)$ is greater than the value of $(V_{405} \cdot w_2)$, then facies FAC1 is associated with point 406. Otherwise, FAC2 is associated with point 406. Similar determination may be computed with point 409 and 412, or any other points of the truncation diagram.

Figure 5A:
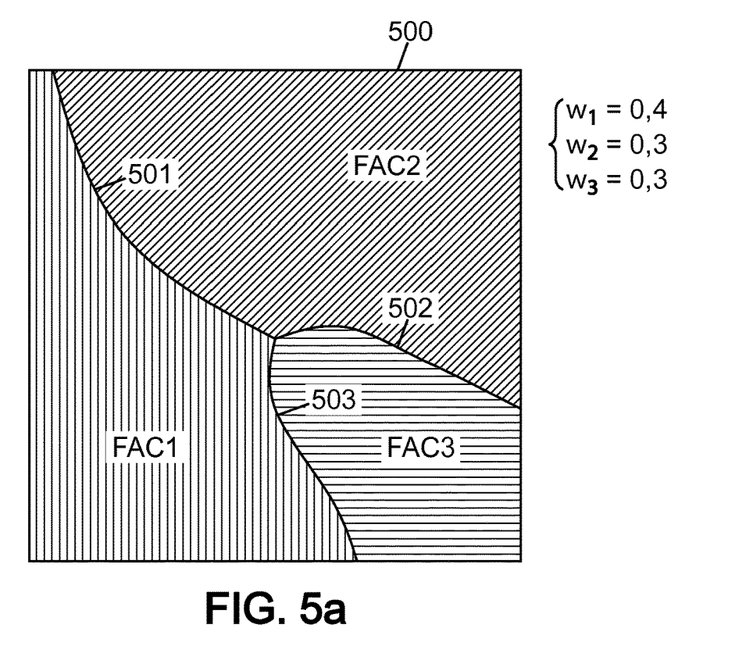
FIGS. 5a to 5b are examples of truncation diagram computed based on the examples of density maps of FIG. 3a to 3c.
Figure 5B:
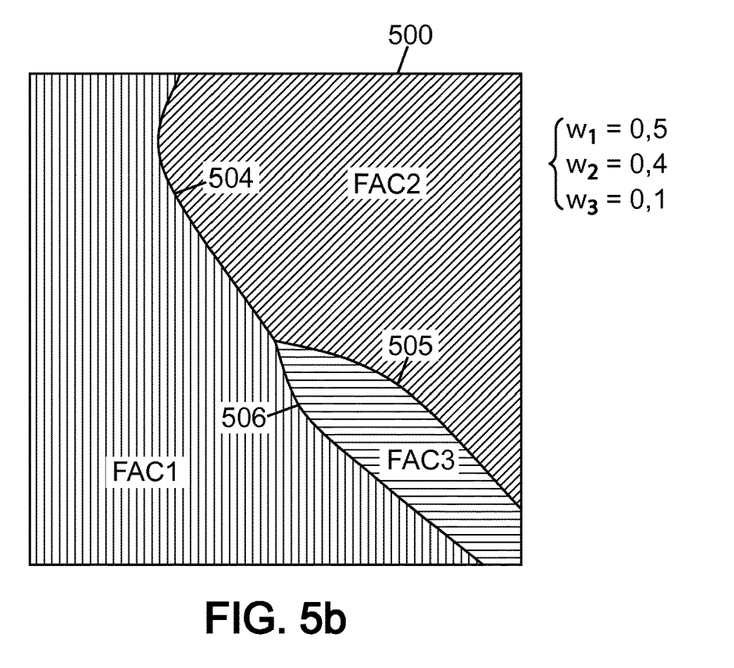

FIGS. 5a to 5b are examples of truncation diagram computed based on the examples of probability maps of FIG. 3a to 3c.

FIG. 5a is a possible truncation diagram determined according the process described in FIG. 4:
the probability values of probability map (representing facies FAC1) of FIG. 3a being weighted by the weight $w_1=0.4$,
the probability values of probability map (representing facies FAC2) of FIG. 3b being weighted by the weight $w_2=0.3$,
the probability values of probability map (representing facies FAC3) of FIG. 3c being weighted by the weight $w_3=0.3$.

Line 501 represents the separation line between facies FAC1 and FAC2 in the truncation diagram 500. Line 502 represents the separation line between facies FAC2 and FAC3 in the truncation diagram 500. Line 503 represents the separation line between facies FAC1 and FAC3 in the truncation diagram 500.

FIG. 5b is a possible truncation diagram determined according the process described in FIG. 4:
the probability values of probability map (representing facies FAC1) of FIG. 3a being weighted by the weight $w_1=0.5$,
the probability values of probability map (representing facies FAC2) of FIG. 3b being weighted by the weight $w_2=0.4$,
the probability values of probability map (representing facies FAC3) of FIG. 3c being weighted by the weight $w_3=0.1$.

As the weight $w_3$ in FIG. 5b is lower than the weight $w_3$ in FIG. 5a (and as the sum $w_1+w_2+w_3$ being constant), the domain associated with facies FAC3 in FIG. 5b is smaller than the domain associated with facies FAC3 in FIG. 5a.

Therefore, it is possible to determine the proportion of the different facies by adapting the different weights. Iteration process may be used to determine the correct/adequate weights.

Figure 6:
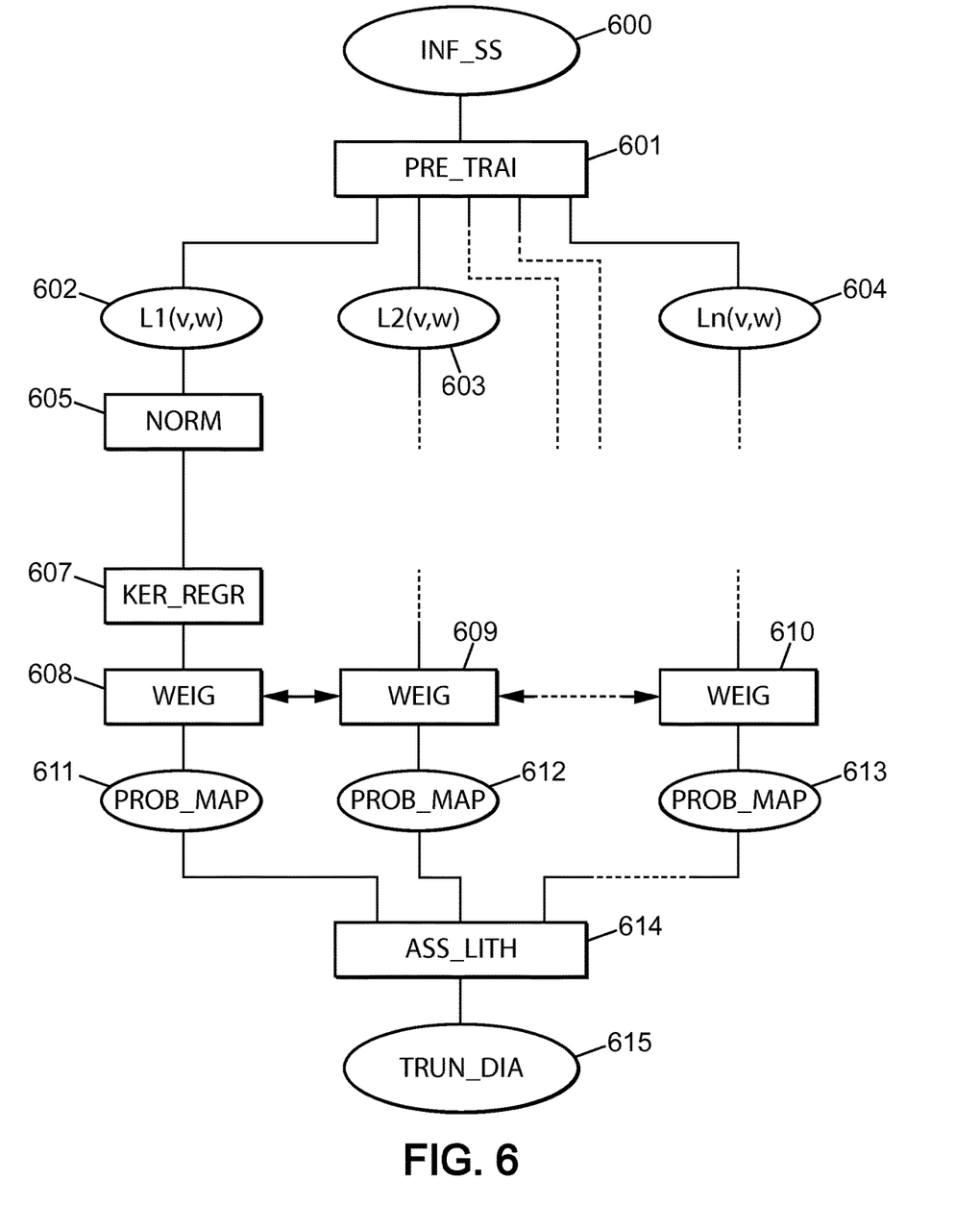
FIG. 6 is a flow chart describing a possible embodiment of the present invention.

FIG. 6 is a flow chart describing a possible embodiment of the present invention.

This flow chart describes a possible method for determining a truncation diagram for a pluri-Gaussian facies estimation.

Upon reception of raw information/data of a zone of a subsoil (message 600), this information/data is pre-computed (step 601) in order to separate data associated with the different facies of the subsoil.

This pre-computation 601 enable the creation of a plurality of bi-variables $L1(v,w)$, $L2(v,w)$ ... $Ln(v,w)$ (602, 603 ... 604, etc.), each variable describing one facies of the zone of the subsoil.

For each variable $L1(v,w)$, $L2(v,w)$ ... $Ln(v,w)$, the variable may be normalized (step 605) as described in relation of FIGS. 3a to 3c.

Moreover, a probability map may be computed (step 607) according to a kernel regression estimate described for instance in relation of FIG. 2b and FIGS. 3a to 3c. An optional weighting (step 608) may be applied on probability values of the probability map as described in relation of the previous Figures.

When all the weighted probability maps are computed (elements 611, 612 ... 613), the truncation diagram (element 615) may be defined (step 614) according to the method described in relation of FIG. 4.

Figure 7:
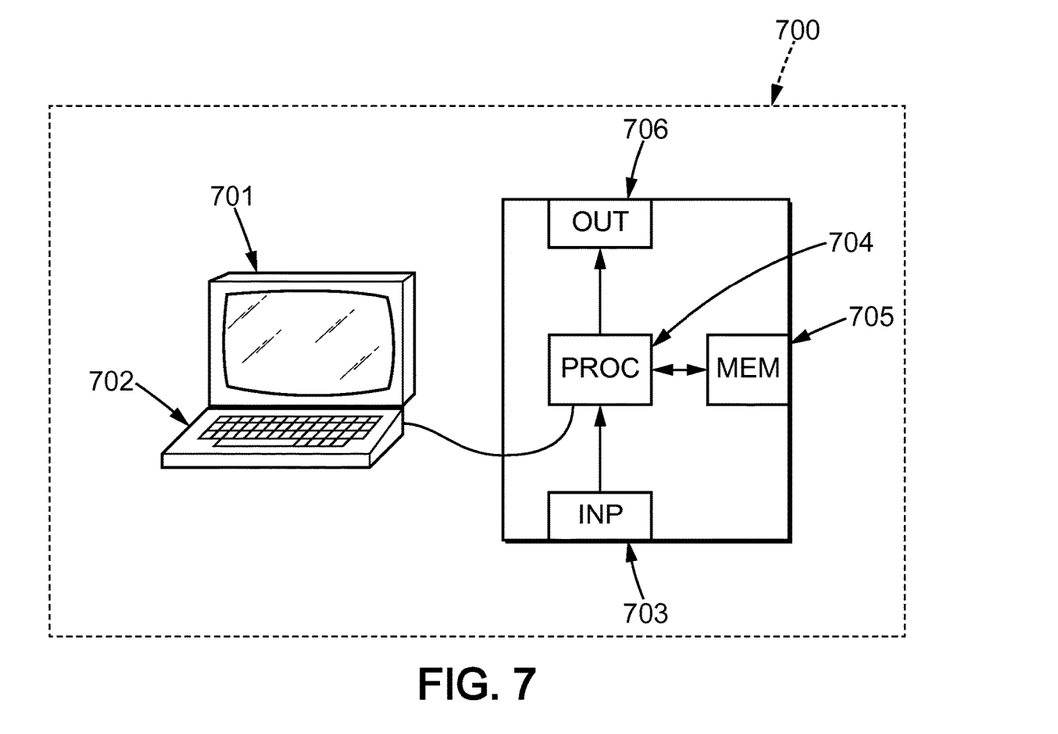
FIG. 7 is a possible device that enables a possible embodiment of the present invention.

Part of this flow chart can represent steps of an example of a computer program which may be executed by the device of FIG. 7.

FIG. 7 is a possible embodiment for a device that enables the present invention.

In this embodiment, the device 700 comprise a computer, this computer comprising a memory 705 to store program instructions loadable into a circuit and adapted to cause circuit 704 to carry out the steps of the present invention when the program instructions are run by the circuit 704.

The memory 705 may also store data and useful information for carrying the steps of the present invention as described above.

The circuit 704 may be for instance:
a processor or a processing unit adapted to interpret instructions in a computer language, or
an electronic card wherein the steps of the invention are described within silicon, or
a programmable electronic chip such as a FPGA chip (for « Field-Programmable Gate Array» ).

This computer comprises an input interface 703 for the reception of data used for the above method according to the invention and an output interface 706 for providing the truncation diagram.

To ease the interaction with the computer, a screen 701 and a keyboard 702 may be provided and connected to the computer circuit 704.

A person skilled in the art will readily appreciate that various parameters disclosed in the description may be modified and that various embodiments disclosed may be combined without departing from the scope of the invention.

In particular, in the above description, reference is made to "facies". This reference may also be, without changing the scope of the invention, "lithotype" or any geological characteristics.

Moreover, auxiliary variables described in relation of Figure are bi-variables, but the variables may have a various number of components: the adaptation of above examples is rendered clear in view of the description.

The above description has been disclosed with two-dimensional random variables but the adaptation with a different number of random variables (e.g. one dimensional or three dimensional random variables) is straight forward in view of the description.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for determining a size of an oil reservoir or a mineral deposit, wherein the method comprises:
collecting a plurality of geological parameters corresponding to a zone in an area of subsoil,
receiving an auxiliary variable for each geological parameter describing the zone;
computing a normalized variable based on the auxiliary variable;
determining a weighted probability map for the normalized variable, the probability map having a plurality of points, each point of the weighted probability map being in correspondence with a point of a pluri-Gaussian truncation diagram of the area of subsoil, each point of the weighted probability map having a probability value; for each point of the truncation diagram:
determining an associated geological parameter based on the probability value of each point of the weighted probability map, each point of the weighted probability map being in correspondence with said point of the truncation diagram,
creating the truncation diagram from the weighted probability map; and
using the truncated diagram to estimate a facies repartition in the subsoil to manage the recovery of oil or minerals.

2. The method according to claim 1, wherein, for each geological parameter in a plurality of geological parameters, the auxiliary variable comprises two one dimensional components.

3. The method according to claim 1, wherein the normalized variable is computed according a uniform transform.

4. The method according to claim 1, wherein determining a probability map comprises:
computing kernel regression estimate of the normalized variable.

5. The method according to claim 1, wherein determining a weighted probability map comprises:
weighting each probability value of a probability map with a determined coefficient.

6. The method according to claim 1, wherein the weight used for determining a weighted probability map is function of coordinates of the zone.

7. The method according to claim 1, wherein, for each point of the truncation diagram, determining an associated geological parameter comprises:
identifying a probability map in the plurality of weighted probability map for which the probability value of the point in correspondence with said point of the truncation diagram is maximum;
associating the geological parameter of the identified probability map with said point of the truncation diagram.

8. The method according to claim 1, wherein geological parameters are facies indicators or lithotypes.

9. A method to determine estimated geological parameters in a model of a real subsoil, wherein the method comprises, for at least one zone of the model:
determining a weight value for each geological parameter in the plurality of geological parameters;
determining truncation diagram according to the determined weight values and according to the method of claim 1; and
computing estimated geological parameters of the at least one zone using a pluri-Gaussian truncated estimation.

10. A non-transitory computer readable storage medium, having a processor and stored thereon a computer program comprising program instructions, the computer program being loadable into a data-processing unit of the processor and adapted to cause the data-processing unit to carry out the steps of claim 1 when the computer program is run by the data-processing device.

11. A device for determining a size of a oil reservoir or a mineral deposit,
wherein the device comprises:
an input interface for receiving a plurality of geological parameters corresponding to a zone in a subsoil and an auxiliary variable for each geological parameter in the plurality of geological parameters describing the zone;
a circuit to compute a normalized variable based on the auxiliary variables;
a circuit to determine a weighted probability map for each normalized variable, the probability map having a plurality of points, each point of the weighted probability map being in correspondence with a point of a pluir-Gaussian truncation diagram, each point of the weighted probability map having a probability value;
a circuit to determine, for each point of the truncation diagram, an associated geological parameter based on the probability value of each point of the weighted probability map, each point of the weighted probability map being in correspondence with said point of the truncation diagram, and
an output interface from the device to provide the truncation diagram to manage a facies repartition in the subsoil for determining a size of the oil reservoir or mineral deposit, said truncation diagram displayed with rectangle domains.

\* \* \* \* \*

UNITED STATES PATENT AND TRADEMARK OFFICE
CERTIFICATE OF CORRECTION

PATENT NO. : 10,379,241 B2
APPLICATION NO. : 14/411430
DATED : August 13, 2019
INVENTOR(S) : Biver et al.

Page 1 of 1

It is certified that error appears in the above-identified patent and that said Letters Patent is hereby corrected as shown below:

In the Claims

Column 11, Line 19 Claim 11:
Delete "pluir" and insert --pluri--.

Signed and Sealed this
Twenty-ninth Day of October, 2019

Andrei Iancu
*Director of the United States Patent and Trademark Office*